Feb. 19, 1952 C. WASMANSDORFF 2,586,190

RADIO RECEIVER NOISE REDUCING CIRCUIT

Filed July 23, 1947

INVENTOR
CARLTON WASMANSDORFF
BY
Moses, Nolte, Crews & Berry
ATTORNEYS

Patented Feb. 19, 1952

2,586,190

UNITED STATES PATENT OFFICE 2,586,190

RADIO RECEIVER NOISE REDUCING CIRCUIT

Carlton Wasmansdorff, Berkeley, Calif.

Application July 23, 1947, Serial No. 763,070

11 Claims. (Cl. 250—20)

This invention relates to electrical circuits and devices for reducing noise appearing at the output of a radio receiver, a carrier frequency amplifier, or other amplifier which is followed by a demodulator, the output being derived from the demodulator.

More particularly, the invention combines the reduction of noise by balancing it out in the signal channel with the further reduction of the remaining noise by limiting the magnitude of peaks which are passed to the input of the audio frequency amplification apparatus or other device responsive to signal frequencies.

An object of the invention is to provide comprehensive noise reduction by first balancing out noise in the signal channel by opposing it with corresponding noise appearing in one or more noise chainnels, the balancing being effected by combining the output of a signal detector with the outputs of one or more noise detectors and at the same time deriving a unidirectional control voltage whose magnitude varies in accordance with the average amplitude of the signal to be demodulated and utilizing this control voltage to establish a varying limiting threshold in an amplitude limiter which in turn removes undesired noise peaks appearing in the signal after detection and noise balancing.

The noise balancing facilities may be of the type illustrated in my copending application, Serial No. 531,047, filed April 14, 1944, now abandoned, which utilizes a two-channel arrangement and which may be characterized as a frequency-modulation discriminator operating as an amplitude-modulation detector, or it may take the form of the multichannel arrangement illustrated in my copending application Serial No. 677,455, filed June 18, 1946, now abandoned, in which two separate noise channels are utilized. For the peak limiting device, a single acting type as shown in my copending application Serial No. 460,077, filed September 29, 1942, now Patent No. 2,446,565, granted August 10, 1948, may be utilized, or the limiter may be of the full-wave type as exemplified in my copending application Serial No. 738,999, filed April 2, 1947, now abandoned. Any other convenient form of noise balancing arrangement may be used which will yield a unidirectional control voltage whose magnitude varies in accordance with the average signal intensity and any convenient form of limiter may be utilized in which this unidirectional control voltage establishes a threshold below which no limiting action occurs in such manner that for weak signals or low carrier level at the detector input the maximum voltage passed by the limiter will be greatly reduced and for stronger signals the maximum voltage will be correspondingly increased, substantially in accordance with the average signal strength.

The invention also provides facilities for deriving an additional control voltage which is always substantially proportional to the signal strength for use in circuits external to those of the invention such as automatic volume control circuits used to control the amplification of amplifying circuits preceding the circuits of the invention. It is a feature of the invention that this control voltage is relatively free from the effects of noise and that this voltage is, therefore, usable in circuits where noise effects would be objectionable.

A further object of the invention is to provide, in combination with the facilities described in the preceding paragraphs, a squelch control circuit actuated by a portion of the unidirectional control voltage. As in the case of the external control voltage, the squelch control circuit is likewise relatively free from the effects of noise and its response is, therefore, governed almost entirely by the average strength of the received signal which is to be demodulated.

Figures 1, 2, 3:
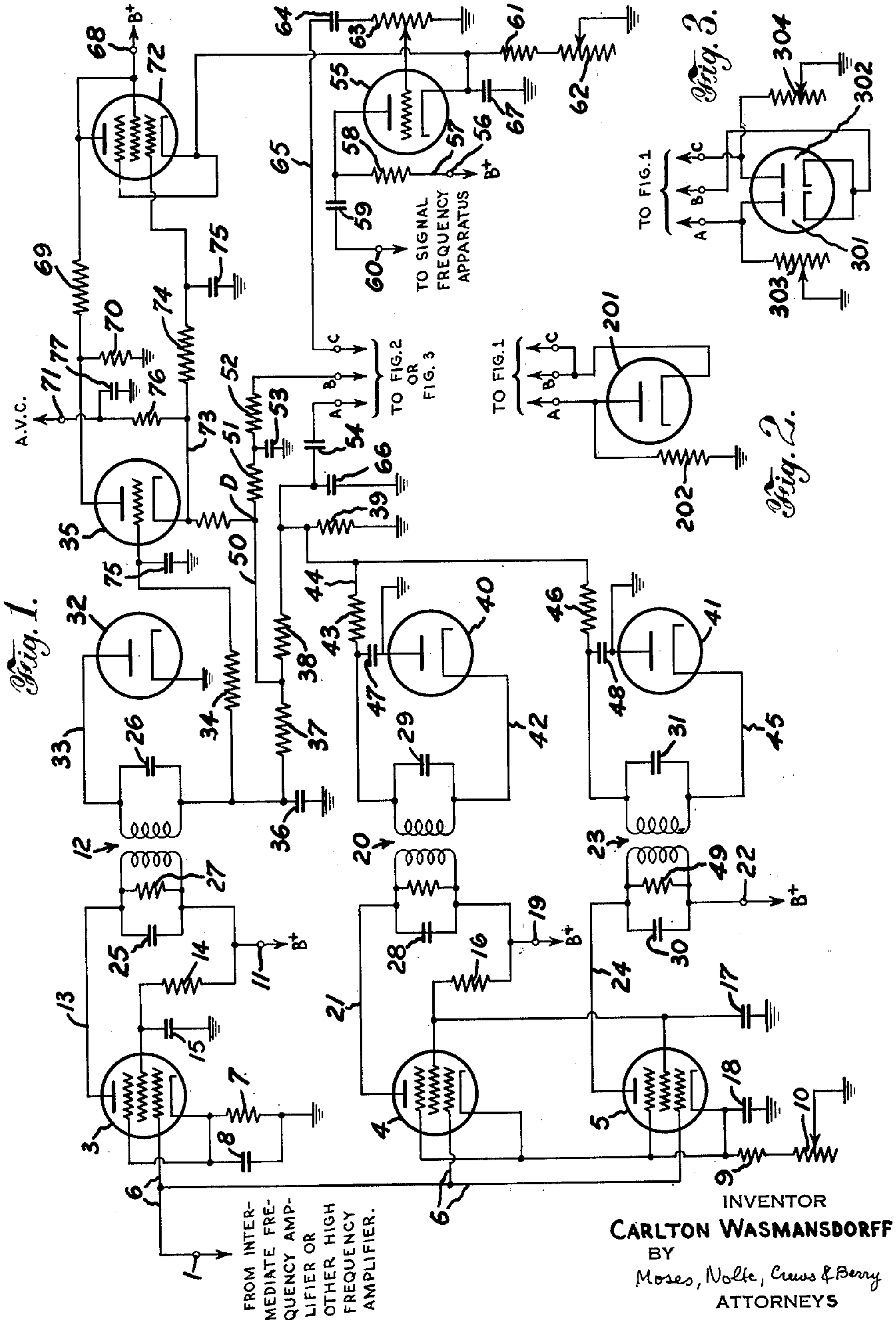
Fig. 1 is a circuit diagram of an embodiment of the invention.
Fig. 2 is a circuit diagram of a peak limiting rectifier for use with Fig. 1 in which the limiting action takes place with peaks of one polarity only.
Fig. 3 is a circuit diagram of an alternative form of peak limiting rectifier in which the limiting action takes place with peaks of both polarities.

Referring to Fig. 1, the carrier frequency or intermediate frequency input to the invention is applied at terminal 1, the other input terminal being ground. In order to provide correct biasing potentials for the control grids of pentodes 3, 4 and 5, the output circuit of the carrier frequency or intermediate frequency amplifier from which the input to terminal 1 is derived should include direct current continuity. Obviously, conventional and well konwn alternative methods of providing grid bias may be utilized if desired, but for convenience the arrangements illustrated are considered to be preferable.

Conductor 6 connects the control grids of the three pentodes 3, 4 and 5 in multiple to terminal 1 so that all three receive the same input potential. A fixed grid bias for pentode 3 is derived from cathode resistor 7 and its associated bypass capacitor 8.

The cathodes of pentodes 4 and 5 are connected in multiple and a common grid bias is derived from cathode resistor 9 and adjustable resistor 10 together with by-pass capacitor 18. Fixed resistor 9 serves to provide a minimum bias. Anode potential for pentode 3 is supplied from terminal 11 through the primary winding of transformer 12 and conductor 13. Screen potential is obtained through dropping resistor 14 and by-pass capacitor 15. Screen potential for pentodes 4 and 5 is derived through dropping resistor 16 and the common by-pass capacitor 17. Anode potential for pentode 4 is derived from terminal 19 through the primary winding of transformer 20 and conductor 21. Similarly, anode potential for pentode 5 is derived from terminal 22 through the primary winding of transformer 23 and conductor 24. Pentodes 3, 4 and 5 are arranged to act as amplifiers so that the common input applied in multiple to the grids of the pentodes will appear separately at their respective outputs.

Transformer 12 is tuned by capacitors 25 and 26 together with damping resistor 27 to have a band pass characteristic which approximates that of the amplifier from which the common input to terminal 1 is derived. The pass-band of transformer 12 and its associated tuning capacitors is such that its central frequency is substantially identical with that of the amplifier with which the invention is used and the sharpness of tuning is determined by the efficiency of the associated components and the value of damping resistor 27. Similarly, transformer 20 is tuned by the capacitors 28 and 29 to have a pass band in which the central frequency is higher than the central frequency of tuned transformer 12. Likewise, transformer 23 is tuned by capacitors 30 and 31 to have a central frequency lower than the central frequency of tuned transformer 12. Diode 32 is connected to deliver a negative potential obtained by rectifying the output of transformer 12 and a portion of the current resulting from this potential flows along conductor 33 through the secondary of tuned transformer 12 and resistors 37, 38 and 39 to ground.

A capacitor 36 by-passes the carrier frequency components to ground. The negative direct current potential of conductor 33 is also applied through resistor 34 to the control grid of triode 35, and the effect of this potential will be described later.

The two diodes 40 and 41 are both connected to deliver a positive potential with respect to ground instead of a negative potential as in the case of diode 32. In the case of diode 40, the positive potential passes along conductor 42 through the secondary of tuned transformer 20 and resistor 43 to conductor 44. A similar positive potential from diode 41 passes along conductor 45, through the secondary winding of tuned transformer 23 and resistor 46 to conductor 44, where it joins the output of diode 40. A portion of the current resulting from this potential flows to ground through resistor 39. Components of carrier frequencies are by-passed to ground through capacitor 47 in the case of diode 40 and capacitor 48 in the case of diode 41.

It is to be noted that the current flowing in resistor 39 is the difference between the current produced by the negative potential of diode 32 and the total current produced by the two positive potentials produced by the diodes 40 and 41. This bucking action causes the combined demodulated outputs derived from the high channel and the low channel to oppose the demodulated output of the signal channel. Because noise components predominate to a greater extent in the high and low channels of tuned transformers 20 and 23 respectively, these noise components tend to balance out corresponding noise components appearing in the signal channel. By adjusting the value of resistor 10, the grid bias of pentodes 4 and 5 may be correspondingly adjusted and an amount of amplification obtained which yields optimum results from a noise balancing standpoint. The effectiveness of balancing is also determined by the tuning and pass-band characteristics of the three tuned transformers 12, 20 and 23. Preferably, the tuning of transformers 20 and 23 is such that the center frequency of tuned transformer 20 is somewhat higher than that of tuned transformer 12, and the tuning of transformer 23 is somewhat lower by substantially an equal amount, the pass-band characteristics being approximately the same for the three transformers.

Other tuning arrangements may also give satisfactory results, and in some instances it may be desirable to omit one of the noise channels entirely. For instance, pentode 5, and tuned transformer 23, and diode 41 might be omitted together with the other associated circuit elements such as tuning capacitors 30 and 31, damping resistor 49, by-pass capacitor 48 and resistor 46, thus leaving a single noise channel to oppose the noise components in the signal channel. This, of course, may require readjustment of the values of other circuit elements so that the output of the single remaining diode will be sufficient to produce the desired noise balancing action.

At conductor 50, a potential appears which is produced predominantly by diode 32 and which is therefore negative with respect to ground. A current caused by this potential flows through resistors 51 and 52 to point B, and in the case of Fig. 2, through diode 201 in its conducting direction and thence through resistor 202 to ground. In the case of Fig. 3, current from point B divides into two branches, one branch flowing through diode 301 and adjustable resistor 303 to ground and the other branch flowing through diode 302 and adjustable resistor 304 to ground.

The circuit constants are so proportioned that the voltage to ground appearing at point D is negative and has superimposed thereon the demodulated signals. The time constant of resistor 51 and capacitor 53 is such that the resultant filtering action effectively removes the signal components and is also such as to prevent response to short bursts of noise. This filtered current is delivered through resistor 52 to point B and thence either to Fig. 2 or to Fig. 3. The current thus filtered constitutes a unidirectional control voltage whose magnitude varies in accordance with the average strength of the signal to be demodulated by the diode 32. The combined output of diodes 40 and 41 consists principally of noise components and is used for balancing out similar noise components appearing in the main signal channel.

As a result of the potential at conductor 50, a current also flows to ground through resistors 38 and 39, this current consisting of both a direct current component and a superimposed signal frequency component. The signal frequency components are separated from the direct current component by capacitor 54 and applied via point A to either Fig. 2 or Fig. 3. By-pass capacitor 66 filters out components of carrier frequency.

Triode 55 is arranged as a signal frequency amplifier. Anode potential is supplied from terminal 56, conductor 57, through load resistor 58. The signal frequency output is taken through blocking capacitor 59 to terminal 60 where it is available for further amplification or for such other use as may be desired. Grid bias is derived from fixed cathode resistor 61 and adjustable cathode resistor 62 and their associated by-pass capacitor 67. The grid is returned to ground through input potentiometer 63, the input being applied to potentiometer 63 through blocking capacitor 64 which is connected via conductor 65 to point C.

Considering first the limiting action obtained using Fig. 2, the unidirectional control voltage at point B produces a current which flows through diode 201 in its conducting direction and through resistor 202 to ground. The current flowing in diode 201 varies in magnitude in accordance with variations in the average signal strength appearing at terminal 1. Demodulated voltages of signal frequency are applied via point A across resistor 202 to ground. Negative peaks of noise will tend to drive point A sufficiently negative to bring the anode of diode 201 to the same potential as its cathode. At this point, conduction through diode 201 will cease and any further increase in negative potential will be unable to reverse the flow of control current through diode 201 by virtue of the unidirectional conductivity of the diode. This produces a limiting action with respect to negative peaks. The positive peaks are not limited by Fig. 2, the limiting action being derived from the unidirectional demodulation which takes place in diode 32 in the main signal channel. The demodulated signal produced by this diode will be negative and may be reduced to zero, but cannot become positive with respect to ground. The combined positive outputs of noise channel diodes 40 and 41 is less than the output of diode 32 and hence these diodes will have relatively little positive output available to produce positive peaks which will be passed by the limiter of Fig. 2.

Thus, the signal frequency components vary the magnitude of the control current in accordance with demodulated signal, these variations in current passing via point C, conductor 65, blocking capacitor 64 and potentiometer 63 to the grid of triode 55 where they are amplified as described above.

Fig. 3 shows a limiter which may be made symmetrical in its action and will suppress peaks of either polarity with equal effectiveness. The control voltage produces a current which divides into two branches, the current in one branch flowing to ground through diode 301 and adjustable resistor 303 and in the other branch through diode 302 and adjustable resistor 304.

The signal frequency components from point A are applied across resistor 303. The limited output is derived from the potential drop across resistor 304. Negative peaks will cause conduction to cease in diode 301. Positive peaks will be passed by diode 301 but will cause conduction to cease in diode 302. Values intermediate these two limiting values will cause a corresponding variation in the current through resistor 304 and will produce a signal output in which peaks of either polarity are limited at point C which will be amplified by triode 55 as heretofore described.

A stabilized control voltage is provided by the action of triode 35 which is connected as a cathode follower. Its grid is connected through resistor 34 to the output of diode 32, which is negative with respect to ground. By-pass capacitor 75 removes the signal components applied to the grid of triode 75 but is sufficiently small in capacitance value to avoid undue sluggishness in responding to changes in signal strength. A reduced anode voltage is supplied from terminal 68 and the potentiometer arrangement comprising resistors 69 and 70. As the grid of triode 35 becomes more negative in response to increased strength of demodulated signal output by diode 32, conduction through triode 35 decreases and its cathode becomes less positive by reason of the reduction in anode current. A resistor 76 and filter capacitor 77 provide further filtering of the control voltage appearing at the cathode of triode 35 before this control voltage is applied to terminal 71. This filtering may be omitted, if not required, or may be provided in other circuits which utilize the control voltage.

Becoming less positive is equivalent to becoming more negative, and hence the automatic volume control voltage applied to terminal 71 becomes more negative, making it suitable for use in the conventional and well-known automatic volume control circuits, in which the gain of amplifier and converter stages may be controlled by varying the grid bias of the tubes, an increase in negative bias ordinarily being utilized to secure a reduction in gain. In this manner, increased signal strength tends to reduce the gain of the preceding stages and reduced signal strength automatically tends to increase the gain, thus reducing the range of variation of signal strength appearing at the output of the controlled stages.

Pentode 72 is a squelch control tube. It is connected to operate as a triode, having its anode and screen connected together. Automatic volume control voltage at conductor 73 is filtered by resistor 74 and capacitor 75 and is applied to the control grid of pentode 72. In the absence of a signal, or if the signal is too weak, a relatively heavy current flows through pentode 72 and through the common cathode resistors 61 and 62 which also serve output triode 55. This renders the cathode of triode 55 sufficiently positive with respect to its grid to cut off current flow in triode 55 thus silencing the output circuit.

When a signal is received, conductor 73 becomes more negative, as previously explained. Conduction through pentode 72 is reduced and the cathode of triode 55 is restored to a less positive potential permitting it again to operate as an output tube.

In operation, a carrier frequency input is received at terminal 1, amplified by pentode 3 and demodulated by diode 32, the band pass action of tuned transformer 12 confining effectiveness to frequencies in the input frequency range.

Noise frequencies, amplified by pentodes 4 and 5 and selected in the higher and lower portions of the input frequency range by tuned transformers 20 and 23, respectively, are demodulated by diodes 40 and 41, respectively, and their combined output is applied with polarity opposite to that of the main signal channel to produce a reduction in noise by balancing out noise components appearing in the signal channel output. The remainig noise is further reduced by a peak limiter whose operating limits are controlled in accordance with the average signal strength by a control voltage produced in the noise balancing circuits. This control voltage is amplified and is available for automatic volume control. The automatic volume control voltage operates a squelch control circuit which cuts off the output amplifier tube in the absence of a received signal.

I have described what I believe to be the best embodiment of my invention. I do not wish, however, to be confined to the embodiment shown, but what I wish to cover by Letters Patent is set forth in the following claims.

I claim:

1. In a noise reducing circuit, a signal channel for demodulating frequencies within a predetermined range, a noise channel for demodulating frequencies within a range overlapping the first-named range, balancing means for combining the output of the signal channel and the noise channel in opposing relationship to reduce noise components appearing at the output of the signal channel, means coupled with the signal channel for producing a control voltage whose magnitude varies in accordance with the average intensity of the signal to be demodulated, peak limiting means in the signal channel output and responsive to the control voltage for varying the maximum permissible signal peak voltage directly in accordance with the magnitude of the control voltage and output means responsive to the signal channel output subject to the action of both the noise balancing means and the peak limiting means.

2. In a noise reducing circuit, a signal channel for demodulating frequencies within a predetermined range, a noise channel for demodulating frequencies within a range differing appreciably from the first-named range, balancing means for combining the output of the signal channel and the noise channel in opposing relationship to reduce noise components appearing at the output of the signal channel, means coupled with the signal channel for producing a control voltage whose magnitude varies in accordance with the average intensity of the signal to be demodulated, peak limiting means in the signal channel output and responsive to the control voltage for varying the maximum permissible signal peak voltage directly in accordance with the magnitude of the control voltage and output means responsive to the signal channel output subject to the action of both the noise balancing means and the peak limiting means.

3. In a device for reducing the effect of noise or other disturbances appearing in the demodulated output of a tuned carrier frequency amplifier having a band pass characteristic, a rectifier circuit responsive to frequencies in the central portion of the pass band of the tuned amplifier, a second rectifier circuit responsive to frequencies in the upper portion of the pass band of the tuned amplifier, a third rectifier circuit responsive to frequencies in the lower portion of the pass band, coordinating means combining the outputs of the two last named rectifier circuits in differential relationship with the output of the first named rectifier circuit to produce a combined output in which noise components appearing at or near the limits of the pass band have appreciably reduced the effects of other noise components in the central portion thereof, filter means coupled with said first named rectifier circuit for producing a unidirectional control current whose magnitude will be substantially directly proportional to the average signal intensity, a circuit including a fourth and fifth rectifier connected with said filter means for energization simultaneously each in its conductive direction by the filtered control current, means for supplying signal frequency current to the circuit of the fourth and fifth rectifiers to vary the instantaneous ratio of division of the direct current flowing between these two rectifiers and for applying peaks of signal frequency voltage in either direction to decrease the current flow in either the fourth or the fifth rectifier, and for suppressing peaks of signal voltage equalling or exceeding that value which will reduce the current at either the fourth or the fifth rectifier to zero, and means for amplifying the signal frequency currents thus limited.

4. In a device for reducing the effect of noise or similar disturbances in the output of a tuned amplifier having a band pass characteristic, a group of three tuned amplifier detectors coupled with the output of the tuned amplifier, one of the group having its center frequency tuned to be substantially identical to the center frequency of the pass-band of the tuned amplifier and the turning of the other two amplifier detectors being higher and lower respectively than the center frequency by substantially the same appreciable amount, coordinating means connecting the combined outputs of the two last-named amplifier detectors to oppose the output of the first-named amplifier detector in such degree and in such phase relationship that noise components appearing at or near the limits of the pass-band of the tuned amplifier tend to oppose and thereby reduce the magnitude of other components relatively nearer the central portion of the pass-band, means coupled with the coordinating means for deriving a unidirectionally demodulated current preponderantly produced by the first named amplifier detector, filter means coupled to the last named means to remove the high frequency components therefrom thus to produce a unidirectionally biased signal frequency current, additional filter means for removing the signal frequency components from the biased signal frequency current to produce a unidirectional control current whose magnitude will be substantially directly proportional to the average signal intensity, a circuit including a pair of rectifiers connected with said additional filter means for energization simultaneously in their conductive directions by the filtered control current, means for applying the signal frequency components of the unidirectionally demodulated current to the circuit of the pair of rectifiers to vary the instantaneous ratio of division of the direct current flowing between the two rectifiers of the pair and for applying peaks of signal frequency voltage of either polarity to decrease the current flow through one or the other of the rectifiers of the pair and for suppressing peaks of signal frequency voltage equalling or exceeding that value which will reduce either one or the other of the rectifier currents to zero, and means for amplifying for reproduction the signal frequency components thus limited.

5. In a device for demodulating a carrier frequency current amplitude-modulated by currents of signaling frequencies, noise reducing means comprising a first demodulating means tuned to respond principally to frequencies in the immediate range of the carrier frequency, a second demodulating means tuned to respond principally to frequencies in a range differing appreciably from the range of response of the first demodulating means, combining means coupled with the outputs of the first and second demodulating means in differential relationship to reduce the effects of noise components demodulated in like phase and like amplitude by both demodulation means for yielding a unidirectional voltage varying in instantaneous amplitude in accordance with the demodulated signal frequency currents, filter means coupled with the combining means for removing the signal frequency components from the varying unidirectional voltage to produce a unidirectional control current whose average magnitude varies in accordance with the average amplitude of the carrier frequency current to be demodulated, rectifier means connected to prevent reversal of the control current, further filter means coupled with the combining means for separating the demodulated signal frequency currents from the varying unidirectional voltage yielded by the combining means, means coupled with the output of the further filter means for varying the instantaneous magnitude of the control current in accordance with the demodulated signal frequency components, and output means responsive to the last-named variations in instantaneous current magnitude.

6. In a device for demodulating a carrier-frequency current amplitude-modulated by currents of signaling frequencies, noise reducing means comprising a first domodulating means tuned to respond principally to frequencies in the immediate range of the carrier frequency, a second demodulating means tuned to respond principally to frequencies in a range differing appreciably from the range of response of the first demodulating means, combining means coupled to the outputs of the first and second demodulating means in differential relationship to reduce the effects of noise components demodulated in like phase and like amplitude by both demodulation means and for yielding a unidirectional voltage varying in instantaneous amplitude in accordance with the demodulated signal frequency currents, filter means coupled with the combining means for removing the signal frequency components from the varying unidirectional voltage to produce a unidirectional control current whose average magnitude varies in accordance with the average amplitude of the carrier frequency current to be demodulated, rectifier means connected to prevent reversal of the control current, further filter means coupled with the combining means for separating the demodulated signal frequency currents from the varying unidirectional voltage yielded by the combining means, means coupled with the output of the further filter means for varying the instantaneous magnitude of the control current in accordance with the demodulated signal frequency components, output means responsive to the last-named variations in instantaneous current magnitude, and squelch control means responsive to a predetermined degree of diminution in the magnitude of the control current for suppressing operation of the output means.

7. In a device for demodulating a carrier frequency current amplitude-modulated by currents of signalling frequencies, noise reducing means comprising a first demodulating means tuned to respond principally to frequencies in the immediate range of the carrier frequency, a second demodulating means tuned to respond principally to frequencies in a range differing appreciably from the range of response of the first demodulating means, combining means coupled with the outputs of the first and second demodulating means in differential relationship to reduce the effects of noise components demodulated in like phase and like amplitude by both demodulation means and for yielding a unidirectional voltage varying in instantaneous amplitude in accordance with the demodulated signal frequency currents, filter means coupled with the combining means for removing the signal frequency components from the varying unidirectional voltage to produce a control current whose average magnitude varies in accordance with the average amplitude of the carrier frequency current to be demodulated, rectifier means connected to prevent reversal of the control current, further filter means coupled with the combining means for separating the demodulated signal frequency currents from the varying unidirectional voltage yielded by the combining means, means coupled with the output of the further filter means for varying the instantaneous magnitude of the control current in accordance with the demodulated signal frequency components, output means responsive to the last named variations in instantaneous current magnitude, and squelch control means responsive to a predetermined degree of diminution in the magnitude of the unidirectional voltage for suppressing operation of the output means.

8. In a device for demodulating a carrier frequency current amplitude-modulated by currents of signaling frequencies, noise reducing means comprising a first demodulating means tuned to respond principally to frequencies in the immediate range of the carrier frequency, a second demodulating means tuned to respond principally to frequencies in a range higher than and differing appreciably from the range of response of the first demodulating means, a third demodulating means tuned to respond principally to frequencies in a range lower than and differing appreciably from the range of response of the first demodulating means, combining means coupled with the output of the first demodulating means with the cumulatively combined outputs of the second and third demodulating means in differential relationship to reduce the effects of noise components demodulated in like phase and like amplitude by both demodulation means and for yielding a unidirectional voltage varying in instantaneous amplitude in accordance with the demodulated signal frequency currents, filter means coupled with the combining means for removing the signal frequency components from the varying unidirectional voltage to produce a unidirectional control current whose average magnitude varies in accordance with the average amplitude of the carrier frequency current to be demodulated, rectifier means connected to prevent reversal of the control current, means for varying the instantaneous magnitude of the control current in accordance with the demodulated signal frequency components, and output means responsive to the variations in instantaneous magnitude.

9. In a device for demodulating a carrier frequency current amplitude-modulated by currents of signaling frequencies, noise reducing means comprising a first demodulating means tuned to respond principally to frequencies in the immediate range of the carrier frequency, a second demodulating means tuned to respond principally to frequencies in a range differing appreciably from the range of response of the first demodulating means, combining means coupled with the outputs of the first and second demodulating means in differential relationship to reduce the effects of noise components demodulated in like phase and like amplitude by both demodulation means and for yielding a unidirectional voltage varying in instantaneous amplitude in accordance with the demodulated signal frequency currents, filter means coupled with the combining means for removing the signal frequency components from the varying unidirectional voltage to produce a unidirectional control current whose average magnitude varies in accordance with the average amplitude of the carrier frequency current to be demodulated, rectifier means connected to prevent reversal of the control current, means for varying the instantaneous magnitude of the control current in accordance with the demodulated signal frequency components, and output means responsive to the last-named variations in instantaneous magnitude.

10. In a device for reducing the effect of noise or other disturbance appearing in the demodulated output of a tuned carrier frequency signal amplifier having a band pass characteristic, a plurality of individual amplifiers having a common input coupled with the output of the tuned amplifier, a tuned transformer coupled with output of each individual amplifier the resonant frequency of one tuned transformer being substantially identical with the carrier frequency and the resonant frequencies of every other tuned transformer differing appreciably from that of the first-named tuned transformer, demodulating means connected with the output of each tuned transformer, the polarity of the output of the demodulating means connected with first-named tuned transformer being instantaneously opposite to that of each of the other demodulating means, adjustable means for varying the relative amounts of amplification of the several individual amplifiers, combining means for combining the outputs of the plurality demodulating means to reduce the effect of noise components appearing in the output of the first-named demodulating means by balancing it against noise components appearing in the output of another demodulating means, peak voltage limiting means coupled with the combined outputs of the demodulating means and having a variable threshold below which no limiting action occurs, means coupled with the combining means responsive to the average intensity of the signal to be demodulated and for varying the threshold of the peak voltage limiting means directly in accordance with the average intensity of the signal to be demodulated, and output means responsive to the demodulated signal after subjection to the action of the peak voltage limiting means.

11. The method of reducing noise in the demodulated output of a carrier frequency signal receiver comprising a tuned amplifier having a band pass characteristic which consists in balancing noise components appearing in the central portion of the amplifier pass-band against noise components appearing in a different portion thereof and limiting the voltage peaks remaining after noise balancing to a magnitude which varies directly in accordance with the signal strength.

CARLTON WASMANSDORFF.

REFERENCES CITED

The following references are of record in the file of this patent:

UNITED STATES PATENTS

| Number | Name | Date |
|---|---|---|
| 1,559,743 | De Bellescize | Nov. 3, 1925 |
| 1,733,414 | Knapp | Oct. 29, 1929 |
| 1,959,275 | McCaa | May 15, 1934 |
| 1,991,277 | Glasgow | Feb. 12, 1935 |
| 2,179,974 | Beers | Nov. 14, 1939 |
| 2,197,516 | Case | Apr. 16, 1940 |
| 2,215,946 | Radinger | Sept. 24, 1940 |
| 2,244,639 | Budelman | June 3, 1941 |
| 2,273,098 | Foster | Feb. 17, 1942 |
| 2,279,819 | Fyler | Apr. 14, 1942 |
| 2,281,395 | Travis | Apr. 28, 1942 |
| 2,324,275 | Becker | July 13, 1943 |
| 2,337,005 | Selby | Dec. 14, 1943 |
| 2,343,115 | Noble | Feb. 29, 1944 |
| 2,422,976 | Nicholson, Jr. | June 24, 1946 |

FOREIGN PATENTS

| Number | Country | Date |
|---|---|---|
| 208,730 | Great Britain | Dec. 11, 1924 |